(12) United States Patent
Hou et al.

(10) Patent No.: US 11,084,392 B2
(45) Date of Patent: Aug. 10, 2021

(54) MODULARIZED EXTENDABLE BATTERY CHANGING STATION DEVICE AND CHARGING RACK

(71) Applicant: NIO (ANHUI) HOLDING CO., LTD., Hefei (CN)

(72) Inventors: Wenjie Hou, Hong Kong (CN); Zhiling Zhao, Hong Kong (CN); Hao Zhu, Hong Kong (CN)

(73) Assignee: NIO (ANHUI) HOLDING CO., LTD., Hefei (CN)

( * ) Notice: Subject to any disclaimer, the term of this patent is extended or adjusted under 35 U.S.C. 154(b) by 113 days.

(21) Appl. No.: 16/312,430

(22) PCT Filed: Jun. 15, 2017

(86) PCT No.: PCT/CN2017/088412
§ 371 (c)(1),
(2) Date: Dec. 21, 2018

(87) PCT Pub. No.: WO2017/219906
PCT Pub. Date: Dec. 28, 2017

(65) Prior Publication Data
US 2019/0202317 A1   Jul. 4, 2019

(30) Foreign Application Priority Data
Jun. 23, 2016 (CN) .......................... 201610466496.0

(51) Int. Cl.
*B60L 53/80* (2019.01)
*B60L 53/30* (2019.01)
(Continued)

(52) U.S. Cl.
CPC ............... *B60L 53/80* (2019.02); *B60L 53/30* (2019.02); *B60S 5/06* (2013.01); *H02J 7/0045* (2013.01); *Y02T 90/12* (2013.01)

(58) Field of Classification Search
CPC .. B60L 53/30; B60L 53/80; B60S 5/06; H02J 7/0042; H02J 7/0045
(Continued)

(56) References Cited

U.S. PATENT DOCUMENTS

| 5,612,606 A * | 3/1997 | Guimarin ................. B60K 1/04 320/109 |
| 8,875,826 B2 * | 11/2014 | Franzen ................... B66F 9/063 180/68.5 |

(Continued)

FOREIGN PATENT DOCUMENTS

| CN | 102887319 | 1/2013 |
| CN | 103507783 | 1/2014 |

(Continued)

OTHER PUBLICATIONS

International Search Report prepared by the State Intellectual Property Office of the P.R. China dated Jul. 17, 2017, for International Application No. PCT/CN2017/088412.

*Primary Examiner* — Edward Tso
*Assistant Examiner* — Aaron Piggush
(74) *Attorney, Agent, or Firm* — Sheridan Ross P.C.

(57) ABSTRACT

A modularized extendable battery changing station device and a charging rack are disclosed, which belong to the technical field of electric vehicle battery charging and swapping. The present technical solutions aim to the solve problems of occupying a large area, a low modularity degree and poor extendibility of the existing battery changing station. For this purpose, the battery changing station device provided in the present technical solutions comprises a charging rack and a battery transfer device; the charging rack comprises at least a battery storage module, the battery storage module being able to realize the storage and charging of a battery, and the battery transfer device being able to pass through the battery storage module. The extendable (Continued)

battery changing station device provided in the technical solutions is able to integrate the functions of power battery transfer, storage and charging.

15 Claims, 4 Drawing Sheets

(51) Int. Cl.
*H02J 7/00* (2006.01)
*B60S 5/06* (2019.01)

(58) Field of Classification Search
USPC .................................. 320/107, 110, 113, 109
See application file for complete search history.

(56) References Cited

U.S. PATENT DOCUMENTS

| | | | | |
|---|---|---|---|---|
| 2010/0141206 | A1* | 6/2010 | Agassi | ...................... B60S 5/06 |
| | | | | 320/109 |
| 2014/0002019 | A1* | 1/2014 | Park | ........................ B60L 53/80 |
| | | | | 320/109 |
| 2019/0126775 | A1* | 5/2019 | Han | ........................ B60L 58/13 |

FOREIGN PATENT DOCUMENTS

| | | |
|---|---|---|
| CN | 103963751 | 8/2014 |
| CN | 103978961 | 8/2014 |
| CN | 104842964 | 8/2015 |
| CN | 206254979 | 6/2017 |
| WO | WO 2009/068880 | 6/2009 |

* cited by examiner

MODULARIZED EXTENDABLE BATTERY CHANGING STATION DEVICE AND CHARGING RACK

CROSS REFERENCE TO RELATED APPLICATIONS

This application is a national stage application under 35 U.S.C. 371 and claims the benefit of PCT Application No. PCT/CN2017/088412 having an international filing date of 15 Jun. 2017, which designated the United States, which PCT application claimed the benefit of China Patent Application No. 201610466496.0 filed 23 Jun. 2016, the disclosure of each of which are incorporated herein by reference.

TECHNICAL FIELD

The present disclosure relates to the field of electric vehicle charging and battery swap technologies, and in particular to a modularized extendable battery swap station device and a modularized extendable charging rack.

BACKGROUND

With the promotion of electric vehicles, how to replenish electric energy for electric vehicles having insufficient quantity of electricity in a timely and effective manner has become a matter of great concern to both manufacturers and vehicle owners. The charging operation is a current mainstream solution in the market, wherein AC slow-charging piles or DC fast-charging piles are arranged in parking spaces. However, in the slow charging mode, a parking space may be occupied for a long time for charging. In the fast charging mode, the charging current is large and is ten times or even several tens of times a conventional charging current; hence, the cycle life of the power battery pack is shortened, and a fully-charged state generally cannot be reached. In a battery swap station, a power battery swap mode is adopted, in which a power-depleted battery pack is directly replaced with a fully-charged battery pack, so as to achieve power replenishment in minutes. Therefore, the power battery swap mode is a highly efficient power supplement mode. However, the existing battery swap station facilities generally have low modularization degree, which is not advantageous for maintenance and transportation. In addition, once the battery swap station is used, the scale thereof cannot be flexibly changed. For example, the vehicle power battery storage and charging platform proposed in the patent No. CN101217237A has an integral steel structure which cannot be expanded. The platform is only adapted to a battery with a charging plug arranged on the side face, and is not adapted to a battery with a plug arranged on the top. For another example, the integral in-vehicle power battery quick-swap system with a movable container proposed in the patent No. CN202098393U can only be expanded by taking the entire container as a unit. Therefore, the system has a poor flexibility and a poor adaptability to the site; similarly, it is only adapted to the battery with the charging plug arranged on the side face. For the battery with the plug arranged on the top, it is more difficult to implement automatic parking and charging, and there is no effective solution for this in the prior art.

Therefore, there is a need in the art for a battery swap station which can be modularized, is extendable and has no civil engineering so as to reduce the footprint of the battery swap station, so that the battery swap station can be flexibly arranged in existing ground parking lots, underground parking lots and other environments suitable for parking in a city.

SUMMARY

A modularized extendable battery swap station device is provided according to an aspect of the present disclosure, with the purpose of addressing the above problems in the prior art, that is, the problems of large footprint, low modularization degree and poor extendibility of existing battery swap stations. The battery swap station device includes a charging rack and a battery transfer device. The charging rack includes at least one battery storage module configured to store and charge a battery, and the battery transfer device is movable through the battery storage module.

In a preferable embodiment of the above modularized extendable battery swap station device, the battery storage module includes an electrical layer, a battery storage layer, a battery vertical-moving layer, a battery transfer device moving layer, and a guide rail layer. The electrical layer is provided with electrical elements configured to charge the battery. The battery storage layer is provided with a locking mechanism configured to fix the battery. In the battery vertical-moving layer, the battery is vertically movable. In the battery transfer device moving layer, the battery transfer device is transversely movable. The guide rail layer is provided with a first guide rail, and the battery transfer device is transversely movable on the first guide rail.

In a preferable embodiment of the above modularized extendable battery swap station device, the battery transfer device includes a base movable along the first guide rail, a battery transfer platform arranged above the base and configured to carry and transport the battery, and a jacking device arranged between the base and the battery transfer platform and configured to drive the battery transfer platform to move up and down.

In a preferable embodiment of the above modularized extendable battery swap station device, the first guide rail is a four-way guide rail, and the battery transfer device is movable in four directions in the battery transfer device moving layer along the four-way guide rail, i.e., frontwards, rearwards, leftwards and rightwards.

In a preferable embodiment of the above modularized extendable battery swap station device, the first guide rail is a two-way guide rail, and the battery transfer device is movable in two directions in the battery transfer device moving layer along the two-way guide rail, i.e., frontwards and rearwards, or leftwards and rightwards.

In a preferable embodiment of the above modularized extendable battery swap station device, the electrical elements include a charger, an input and output interface, an electrical plug and a sensor.

In a preferable embodiment of the above modularized extendable battery swap station device, the charging rack further includes a lift module configured to drive the battery transfer device to move up and down among different layers of the charging rack.

In a preferable embodiment of the above modularized extendable battery swap station device, the lift module is provided with a second guide rail for the movement of the battery transfer device, and the second guide rail can drive the battery transfer device to move up and down in the lift module.

A modularized extendable charging rack is further provided according to another aspect of the present disclosure. The charging rack includes at least one battery storage module configured to store and charge a battery, and a battery transfer device is movable through the battery storage module.

In a preferable embodiment of the above modularized extendable charging rack, the battery storage module includes an electrical layer, a battery storage layer, a battery vertical-moving layer, a battery transfer device moving layer, and a guide rail layer. The electrical layer is provided with electrical elements configured to charge the battery. The battery storage layer is provided with a locking mechanism configured to fix the battery. In the battery vertical-moving layer, the battery is vertically movable. In the battery transfer device moving layer, the battery transfer device is transversely movable. The guide rail layer is provided with a first guide rail, and the battery transfer device is transversely movable on the first guide rail.

In a preferable embodiment of the above modularized extendable charging rack, the first guide rail is a four-way guide rail, and the battery transfer device is movable in four directions in the battery transfer device moving layer along the four-way guide rail, i.e., frontwards, rearwards, leftwards and rightwards.

In a preferable embodiment of the above modularized extendable charging rack, the first guide rail is a two-way guide rail, and the battery transfer device is movable in two directions in the battery transfer device moving layer along the two-way guide rail, i.e., frontwards and rearwards, or leftwards and rightwards.

In a preferable embodiment of the above modularized extendable charging rack, the electrical elements include a charger, an input and output interface, an electrical plug and a sensor.

In a preferable embodiment of the above modularized extendable charging rack, the charging rack further includes a lift module configured to drive the battery transfer device to move up and down among different layers of the charging rack.

In a preferable embodiment of the above modularized extendable charging rack, the lift module is provided with a second guide rail for the movement of the battery transfer device, and the second guide rail can drive the battery transfer device to move up and down in the lift module.

In the technical solution according to the present disclosure, with a modularization design, the charging rack can be composed of multiple independent battery storage modules in a modularized manner. In this way, it is convenient for the charging rack to pass through a narrow region, and the battery swap station can be freely upsized or downsized in the scale. In addition, the battery storage module has a layered structure (an electrical layer, a battery storage layer, a battery vertical-moving layer, a battery transfer device moving layer and a guide rail layer) which, in combination with a lift module, can realize a free movement of the battery transfer device in the charging rack. Therefore, an extendable battery swap station device is provided according to the present disclosure, in which functions of moving, storing and charging of the power battery are integrated.

DETAILED DESCRIPTION

Preferred embodiments of the present disclosure are described below with reference to the accompanying drawings. It should be understood by those skilled in the art that these embodiments are only provided for illustrating the technical principles of the present disclosure, and are not intended to limit the scope of protection of the present disclosure. For example, although the charging rack described herein has a two-layer structure, it should be understood by those skilled in the art that the scope of protection of the present disclosure is not limited by the number of layers included in the charging rack described herein. The charging rack may be upsized or downsized by those skilled in the art based on actual application requirements by increasing or decreasing the battery storage module so as to be adapted to specific applications.

It should be noted that in the description of the present disclosure, orientations or positional relationships indicated by terms "center", "upper", "lower", "left", "right", "vertical", "horizontal", "inner" and "outer" are based on orientations or positional relationships shown in the drawings, and are merely for facilitating the description of the present disclosure and for simplifying the description, instead of indicating or implying that the devices or elements referred to must have particular orientations, or are configured or operated in particular orientations. Therefore, they should not be construed as limiting the present disclosure. Moreover, terms "first," "second," and "third" are only used for description and are not to be construed as indicating or implying relative importance.

In addition, it should be noted that in the description of the present disclosure, terms "install", "couple" and "connect" should be understood broadly, unless explicitly specified or defined otherwise. For example, the connection may be a fixedly connection, a removable connection or an integrated connection, may be a mechanical connection or an electrical connection, may be a direct connection or an indirect connection via an intermediate medium, and may be an internal communication between two elements. Those skilled in the art may interpret specific meanings of the above terms in the present disclosure in accordance with specific conditions.

The object of the present disclosure is to provide a battery swap station device which has a small footprint, is extendable and can be flexibly deployed in existing ground parking lots, underground parking lots and other environments suitable for parking in a city. Therefore, with the modularization design of the present disclosure, a sum of volumes of single components is reduced, so that it is convenient for the battery swap station device to pass through a narrow region, thereby achieving a rapid installation and deployment. Meanwhile, with the modularized manner, the battery swap station device can be upsized or downsized in the scale. The modularized extendable battery swap station device according to the present disclosure is described below by taking a charging rack having a two-layer structure as an example.

Figure 1:
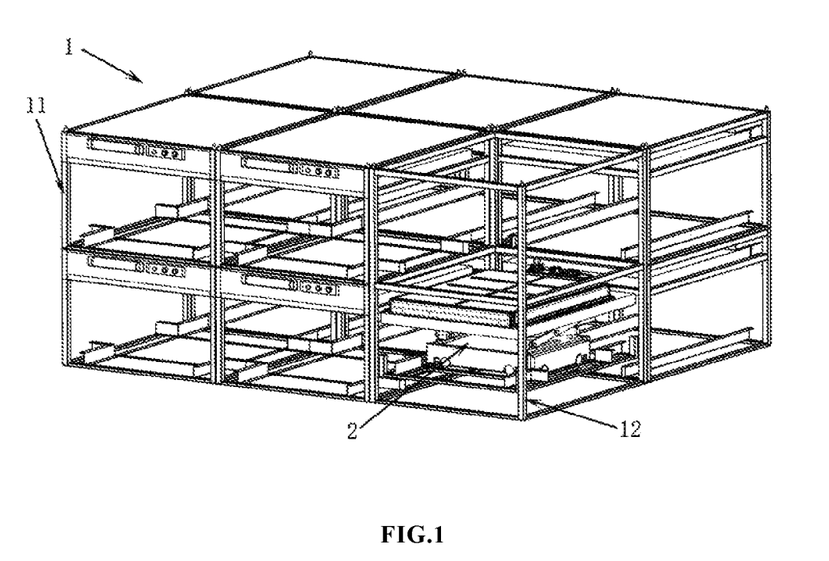
FIG. 1 is a schematic structural diagram of a charging rack and a battery transfer device according to the present disclosure, and a charging rack having a two-layer structure is taken as an example in the figure for ease of description.
Figure 2:
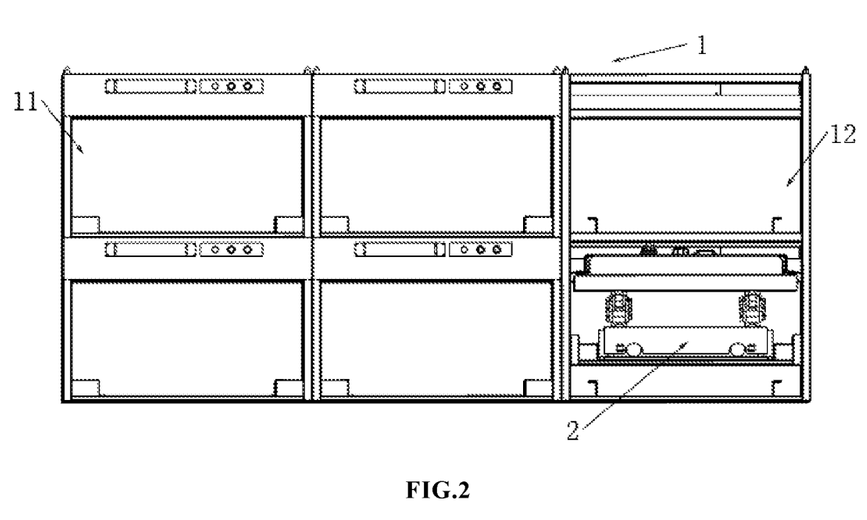
FIG. 2 shows front views of a charging rack and a battery transfer device according to the present disclosure, and a charging rack having a two-layer structure is taken as an example in the figure for ease of description.

Reference is made to FIG. 1 and FIG. 2, in which FIG. 1 is a schematic structural diagram of a charging rack and a battery transfer device according to the present disclosure, and FIG. 2 shows front views of a charging rack and a battery transfer device according to the present disclosure. As shown in FIG. 1 and FIG. 2, a modularized extendable battery swap station device according to the present disclosure includes a charging rack 1 and a battery transfer device 2. The charging rack 1 includes multiple battery storage modules 11 configured to store and charge a battery. The battery transfer device 2 is movable through the battery storage module 11. Specifically, after carrying a battery with a low quantity of electricity to the charging rack 1, the battery transfer device 2 moves inside the charging rack 1, places the battery into a vacant battery storage module 11, moves to a battery storage module 11 in which a fully-charged battery is stored, takes the fully-charged battery out and transfers the fully-charged battery to an electric vehicle for which the battery is to be swapped. It should be noted that the battery storage modules 11 in the charging rack 1 are stacked together in a modularized manner, and adjacent battery storage modules 11 may be connected to each other in any appropriate way. Therefore, the charging rack 1 can be upsized or downsized in the scale based on actual applications.

Figure 3A:
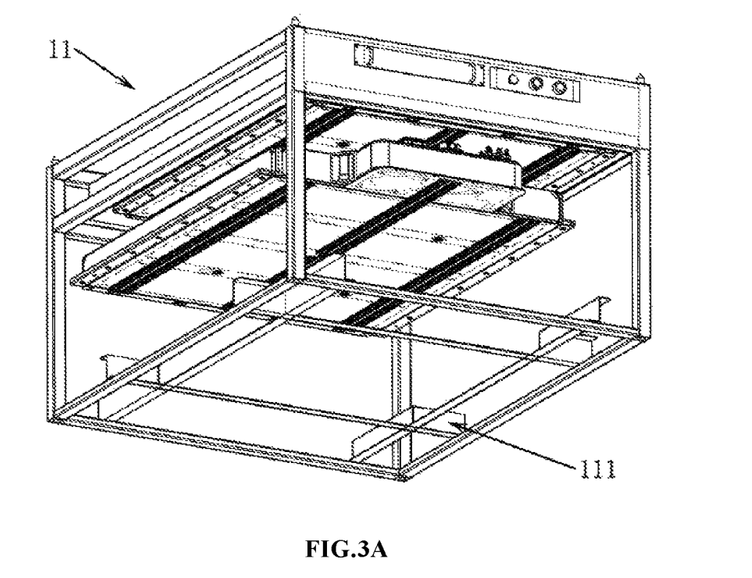
FIG. 3A is a schematic structural diagram of a battery storage module A of a charging rack according to the present disclosure.
Figure 3B:
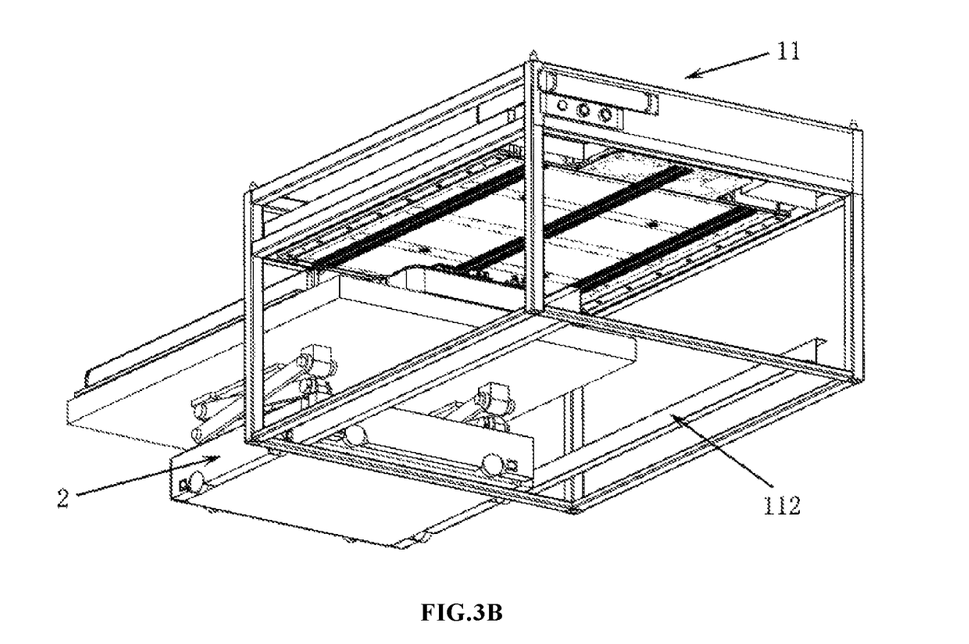
FIG. 3B is a schematic structural diagram of a battery storage module B of a charging rack according to the present disclosure.
Figure 3C:
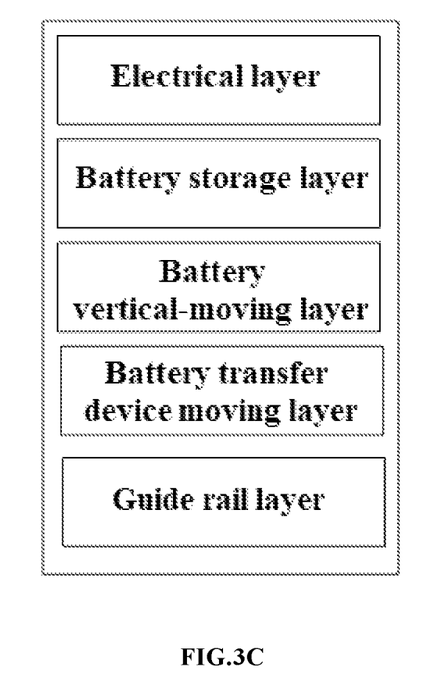
FIG. 3C is a schematic structural diagram of individual layers inside a battery storage module of a charging rack according to the present disclosure.

Reference is made to FIG. 3C, which is a schematic structural diagram of individual layers inside a battery storage module of a charging rack according to the present disclosure. As shown in FIG. 3C, the battery storage module 11 includes an electrical layer, a battery storage layer, a battery vertical-moving layer, a battery transfer device moving layer and a guide rail layer, from top to bottom. The electrical layer is provided with electrical elements such as a charger for charging a battery, an input and output interface, an electrical plug and a sensor. The battery storage layer is provided with a locking mechanism for fixing the battery. In the battery vertical-moving layer, a space is arranged for a vertical movement of the battery, that is, the battery is vertically movable in the battery vertical-moving layer. In the battery transfer device moving layer, a space is arranged for a transverse movement of the battery transfer device 2. When setting the size of the space for the transverse movement of the battery transfer device 2, the thickness of a battery carried on the battery transfer device 2 has to be considered. That is, when a battery is carried on the battery transfer device 2, the battery transfer device 2 together with the battery is transversely movable in the battery transfer device moving layer without interfering with the locking mechanism in the battery storage layer. The guide rail layer is provided with a first guide rail to allow the battery transfer device 2 to move transversely on the first guide rail. It should be noted that although the battery storage module 11 is divided into multiple functional layers in the present disclosure, the division is only based on functions or uses and is not intended to limit the specific structure of the battery storage module 11. The charging rack 1 is composed of multiple modules containing the above functional layers. Next, two kinds of structures of the battery storage module 11 will be described. Reference is to FIG. 3A and FIG. 3B, in which FIG. 3A is a schematic structural diagram of a battery storage module A of a charging rack according to the present disclosure, and FIG. 3B is a schematic structural diagram of a battery storage module B of a charging rack according to the present disclosure. As shown in FIG. 3A, the battery storage module A includes an electrical layer, a battery storage layer, a battery vertical-moving layer, a battery transfer device moving layer and a guide rail layer. The first guide rail in the guide rail layer is a four-way guide rail 111, and the battery transfer device 2 is movable in four directions in the battery transfer device moving layer along the four-way guide rail 111, i.e., frontwards, rearwards, leftwards and rightwards. As shown in FIG. 3B, the battery storage module B includes an electrical layer, a battery storage layer, a battery vertical-moving layer, a battery transfer device moving layer and a guide rail layer. The first guide rail installed in the guide rail layer is a two-way guide rail 112, and the battery transfer device 2 is movable in two directions in the battery transfer device moving layer along the two-way guide rail 112, i.e., frontwards and rearwards, or leftwards and rightwards. The charging rack 1 in the embodiment includes the battery storage module A and the battery storage module B.

The battery transfer device 2 includes a base, a battery transfer platform and a jacking device. The base is movable along the first guide rail. The battery transfer platform is arranged above the base, and configured to carry and transport a battery. The jacking device is arranged between the base and the battery transfer platform, and can drive the battery transfer platform to move up and down. As an example, the jacking device shown in FIG. 3B is a scissor-type lifter. Specifically, after a battery is carried to a vacant battery storage module inside the charging rack 1 by the battery transfer device 2, the jacking device jacks the battery transfer platform upwards, and the battery transfer platform is moved vertically and upwards together with the battery placed thereon. Then, the battery is fixed on the battery storage layer by the battery locking mechanism. The battery is then charged in the electrical layer. Thereafter, the battery transfer device is moved to another battery storage module along the first guide rail to take another battery out.

Figure 4A:
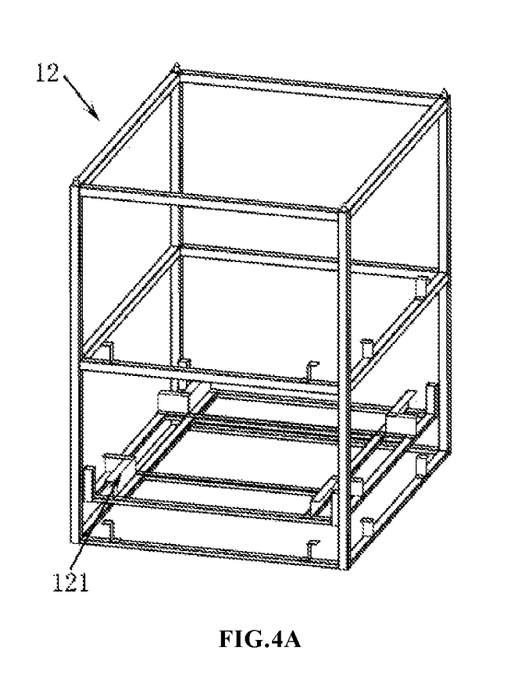
FIG. 4A is a schematic structural diagram of a lift module of a charging rack according to the present disclosure, and a motor and a controller installed in an electrical layer are omitted in the figure for clarity.
Figure 4B:
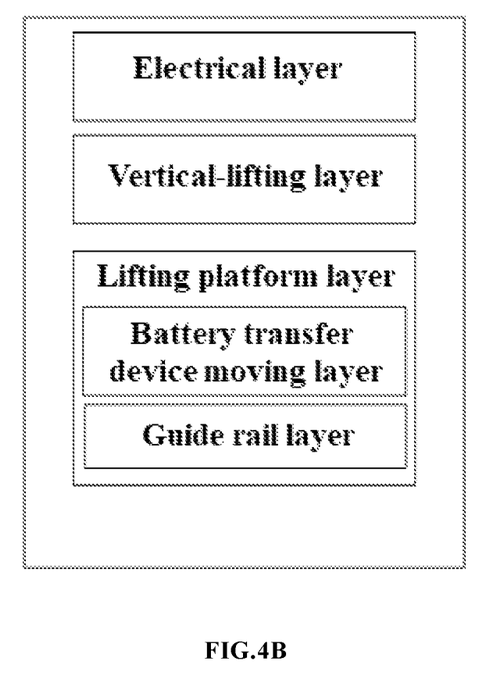
FIG. 4B is a schematic structural diagram of individual layers inside a lift module of a charging rack according to the present disclosure.

Reference is continuously made to FIG. 1. As shown in FIG. 1, the charging rack 1 further includes a lift module 12 configured to move the battery transfer device 2 up and down among different layers of the charging rack 1. Reference is made to FIG. 4B, which is a schematic structural diagram of individual layers inside a lift module of a charging rack according to the present disclosure. As shown in FIG. 4B, the lift module 12 includes an electrical layer, a vertically lifting layer and a lifting platform layer. The electrical layer is provided with a motor and a controller. The motor is configured to drive a lifting platform to move up and down, and the controller is configured to control an overall operation of the lift module 12. A space is arranged in the vertically lifting layer for a vertical movement of the lifting platform, i.e., the battery transfer device is movable up and down in the vertically lifting layer. The lifting platform layer is configured to carry the battery transfer device, and is vertically movable when driven by the motor, thereby driving the battery transfer device to move up and down. The lifting platform layer further includes a battery transfer device moving layer and a guide rail layer. A space is arranged in the battery transfer device moving layer for a transverse movement of the battery transfer device 2. When setting the size of the space for the transverse movement of the battery transfer device 2, the thickness of a battery carried on the battery transfer device 2 has to be considered. That is, when a battery is carried on the battery transfer device 2, the battery transfer device 2 together with the battery is transversely movable in the battery transfer device moving layer. A second guide rail 121 is installed in the guide rail layer, and the battery transfer device 2 is transversely movable on the second guide rail 121. It should be noted that although the lift module 12 is divided into multiple functional layers based on functions in the present disclosure, the division is only based on functions or uses, and is not intended to limit the specific structure of the battery storage module 11. Reference is made to FIG. 4A, which is a schematic structural diagram of the lift module of the charging rack according to the present disclosure. For clarity, the motor and the controller installed in the electrical layer are omitted. As shown in FIG. 4A, a second guide rail 121 for the movement of the battery transfer device 2 is installed in the lifting platform layer of the lift module 12. The second guide rail 121 is a four-way guide rail. The battery transfer device 2 is not only movable in four directions (forwards, rearwards, leftwards and rightwards) in the battery transfer device moving layer along the four-way guide rail, but also is movable up and down when driven by the second guide rail 121 so that the battery transfer device is movable among different layers of the charging rack 1. It should be noted that the second guide rail in the lift module 12 is moved up and down when driven by the motor, and when the height of the charging rack 1 changes, for example, if the charging rack 1 has three layers, the height of the lift module 2 needs to be also adjusted to a position that is consistent with the height of the charging rack 1. Further, although the second guide rail 121 in FIG. 4A is the four-way guide rail, the present disclosure is not limited thereto, and the second guide rail 121 may be arranged as a two-way guide rail.

It can be understood by those skilled in the art that in addition to the aforementioned battery transfer device including the base, the battery transfer platform and the jacking device, other battery transfer device capable of being used in cooperation with the charging rack of the present disclosure may also be included.

The technical solutions of the present disclosure have been described hitherto in conjunction with the preferred embodiments shown in the drawings. However, it is readily conceivable by those skilled in the art that the scope of protection of the present disclosure is apparently not limited to these embodiments. Equivalent modifications or substitutions may be made to related technical features by those skilled in the art without departing from the principle of the present disclosure, and technical solutions derived from these modifications and substitutions will all fall within the scope of protection of the present disclosure.

What is claimed is:

1. A modularized extendable battery swap station device, comprising a charging rack and a battery transfer device, wherein the charging rack comprises at least one battery storage module configured to store and charge a battery, and the battery transfer device as a whole is movable through the inside of the battery storage module;
   wherein the battery storage module comprises:
      an electrical layer, provided with electrical elements configured to chare the battery;
      a battery storage layer, provided with a locking mechanism configured to fix the battery;
      a battery vertical-moving layer, in which the battery is vertically movable;
      a battery transfer device moving layer, in which the battery transfer device is transversely movable; and
      a guide rail layer provided with a first guide rail, the battery transfer device being transversely movable on the first guide rail.

2. The modularized extendable battery swap station device according to claim 1, wherein the battery transfer device comprises:
   a base, which is movable along the first guide rail;
   a battery transfer platform, which is arranged above the base and configured to carry and transport the battery; and
   a jacking device, which is arranged between the base and the battery transfer platform, and configured to drive the battery transfer platform to move vertically.

3. The modularized extendable battery swap station device according to claim 2, wherein the first guide rail is a four-way guide rail, and the battery transfer device is movable in four directions in the battery transfer device moving layer along the four-way guide rail.

4. The modularized extendable battery swap station device according to claim 2, wherein the first guide rail is a two-way guide rail, and the battery transfer device is movable in two directions in the battery transfer device moving layer along the two-way guide rail.

5. The modularized extendable battery swap station device according to according to claim 3, wherein the electrical elements comprise a charger, an input and output interface, an electrical plug and a sensor.

6. The modularized extendable battery swap station device according to according to claim 4, wherein the electrical elements comprise a charger, an input and output interface, an electrical plug and a sensor.

7. The modularized extendable battery swap station device according to claim 1, wherein the charging rack further comprises a lift module configured to drive the battery transfer device to move up and down among different layers of the charging rack.

8. The modularized extendable battery swap station device according to claim 7, wherein the lift module is provided with a second guide rail for the movement of the battery transfer device, and the second guide rail can drive the battery transfer device to move up and down in the lift module.

9. A modularized extendable charging rack, comprising at least one battery storage module configured to store and charge a battery, wherein a battery transfer device as a whole is movable through the inside of the battery storage module;
   wherein the battery storage module comprises:
      an electrical layer, provided with electrical elements configured to charge the battery,
      a battery storage layer, provided with a locking mechanism configured to fix the battery;
      a battery vertical-moving layer, in which the battery is vertically movable;
      a battery transfer device moving layer, in which the battery transfer device is transversely movable; and
      a guide rail layer provided with a first guide rail, the battery transfer device being transversely movable on the first guide rail.

10. The modularized extendable charging rack according to claim 9, wherein the first guide rail is a four-way guide rail, and the battery transfer device is movable in four directions in the battery transfer device moving layer along the four-way guide rail.

11. The modularized extendable charging rack according to claim 9, wherein the first guide rail is a two-way guide rail, and the battery transfer device is movable in two directions in the battery transfer device moving layer along the two-way guide rail.

12. The modularized extendable charging rack according to claim 10, wherein the electrical elements comprise a charger, an input and output interface, an electrical plug and a sensor.

13. The modularized extendable charging rack according to claim 11, wherein the electrical elements comprise a charger, an input and output interface, an electrical plug and a sensor.

14. The modularized extendable charging rack according to claim 9, wherein the charging rack further comprises a lift module configured to drive the battery transfer device to move up and down among different layers of the charging rack.

15. The modularized extendable charging rack according to claim 14, wherein the lift module is provided with a second guide rail for the movement of the battery transfer device, and the second guide rail can drive the battery transfer device to move up and down in the lift module.

* * * * *

UNITED STATES PATENT AND TRADEMARK OFFICE
CERTIFICATE OF CORRECTION

PATENT NO. : 11,084,392 B2  
APPLICATION NO. : 16/312430  
DATED : August 10, 2021  
INVENTOR(S) : Wenjie Hou, Zhiling Zhao and Hao Zhu Page 1 of 1

It is certified that error appears in the above-identified patent and that said Letters Patent is hereby corrected as shown below:

In the Claims

Claim 1, Column 7, Line 63: delete "chare" and insert --charge--

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*